Dec. 11, 1934.  D. B. REPLOGLE  1,983,565
CORD REEL AND METHOD OF MAKING THE SAME
Filed Nov. 12, 1930  4 Sheets-Sheet 3

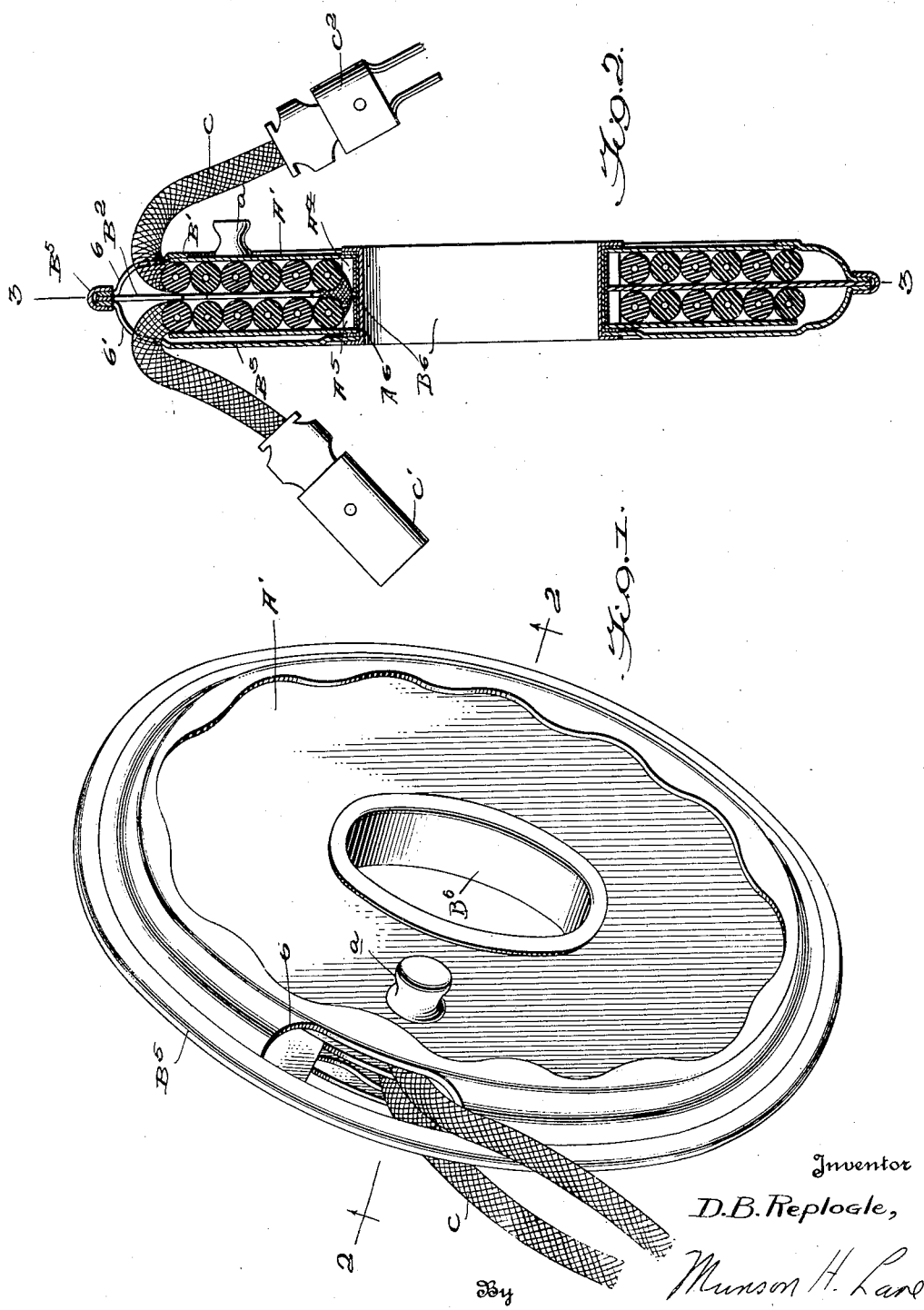

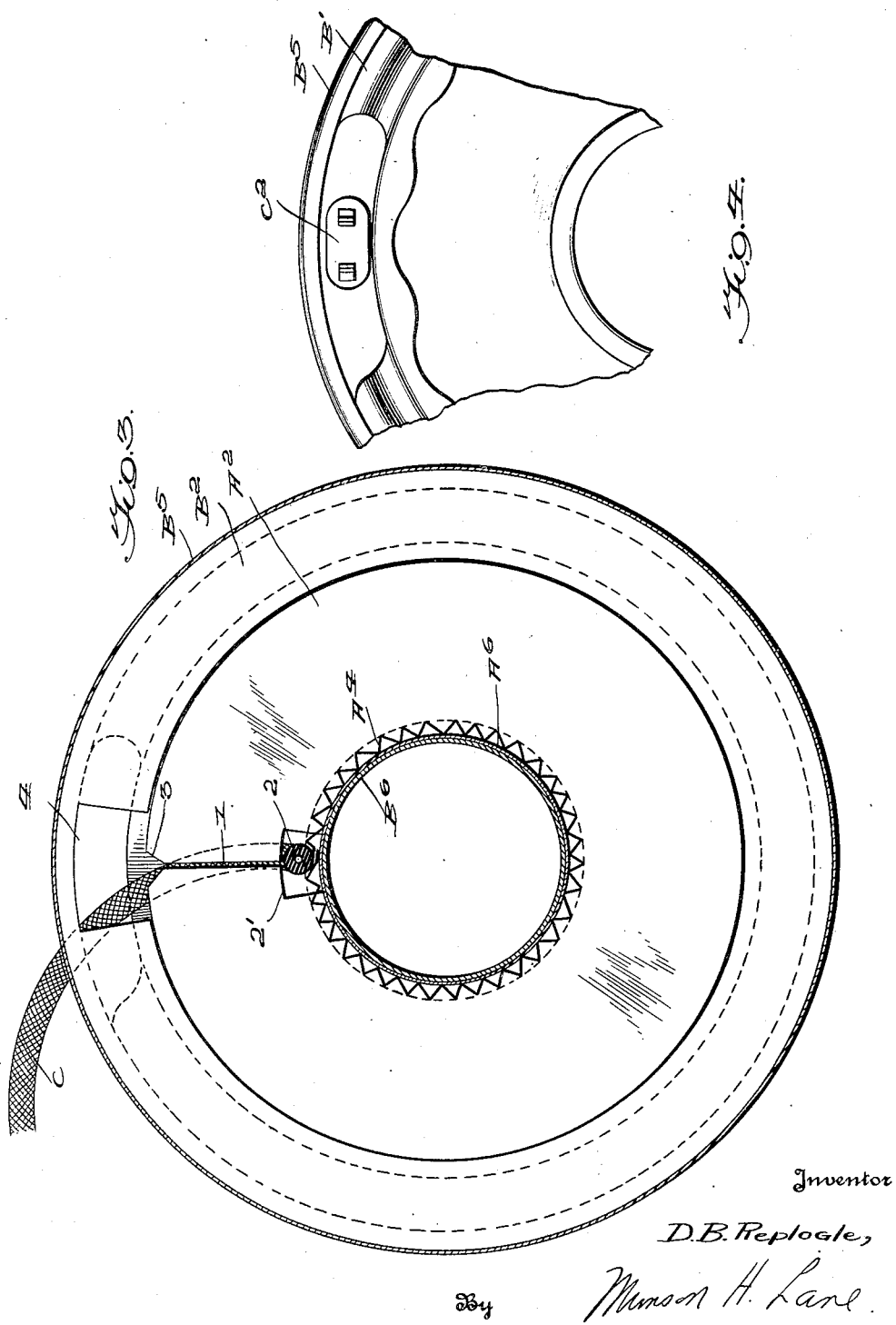

Inventor
D. B. Replogle,
Munson H. Lane
Attorney

Dec. 11, 1934. D. B. REPLOGLE 1,983,565
CORD REEL AND METHOD OF MAKING THE SAME
Filed Nov. 12, 1930  4 Sheets-Sheet 4

Inventor
D. B. Replogle.

Patented Dec. 11, 1934

1,983,565

UNITED STATES PATENT OFFICE 1,983,565

CORD REEL AND METHOD OF MAKING THE SAME

Daniel Benson Replogle, Berkeley, Calif., assignor to Citizens Trust Company of Toledo, Ohio, a corporation of Ohio, as trustee Application November 12, 1930, Serial No. 495,223

11 Claims. (Cl. 242—97)

My invention relates to cord reels of the general character of that described in my prior Patent No. 1,692,517, granted November 20, 1928.

In devices of this character a cord is secured to the spool of the reel by doubling the cord and inserting the loop at its middle into a radial slot in the partition member of the spool. A mouth or opening in the casing is provided to admit the cord and permit its end portions to be drawn into or out of the casing.

In my present device the mouth is constructed entirely by making suitable openings or perforations through the edges of disks, thus doing away with several auxiliary parts, and making a simple, durable and reliable structure, easy to construct and operate.

The means for holding the cord in the reel is equally simple, consisting merely of a radial slit in the partition member, with suitable enlargements at its ends. By means of this construction the cord is easily placed, but firmly held in position, where it will remain during use and will be detached only when the operator so desires.

Another improvement consists in so forming the rear flange of the spool by cutting it out of the disk to form at the same time the front casing or rim member of the casing, in order that the said rear flange will be equal in effective diameter to the front flange of the spool, while said front flange will be partly overlapped by the ring from which the rear flange is cut. Other improvements appear in the specification and claims.

Another improvement consists in constructing a reel that may be slipped on the arm of the operator and so carried when not in use.

To these ends the invention consists in the construction and arrangement of parts and devices as set forth herein and illustrated in the accompanying drawings, in which, Fig. 1 is a perspective view of the complete device as viewed from the front;

Fig. 2 is a section on line 2—2 of Fig. 1;

Fig. 3 is a section on line 3—3 of Fig. 2;

Fig. 4 is a detail showing a portion of the reel from the rear, with the plug $C^2$ projecting from the opening in the ring at the front of the casing;

The spool or reel proper comprises a front disk or flange member $A^1$, a rear disk or flange member $A^3$, and a central disk or partition member $A^2$. Crimped or corrugated spacing rings $A^4$ and $A^5$ hold these members in properly spaced relation, and all the spool members are held together by a central flanged cylindrical member $A^6$. The partition member $A^2$ has a radial slit 1, which flares at its outer end to form an enlargement 3. An enlargement 2 is also formed at its inner end. The walls $2'$ of recess or enlargement 2 are shown concentric to the center of the partition $A^2$, but they may be made more flaring, like the walls 3, to facilitate withdrawal of the cord, if withdrawal is necessary.

On the front face of the flange member $A^1$ is a knob $a$, for winding the reel.

Figure 5:
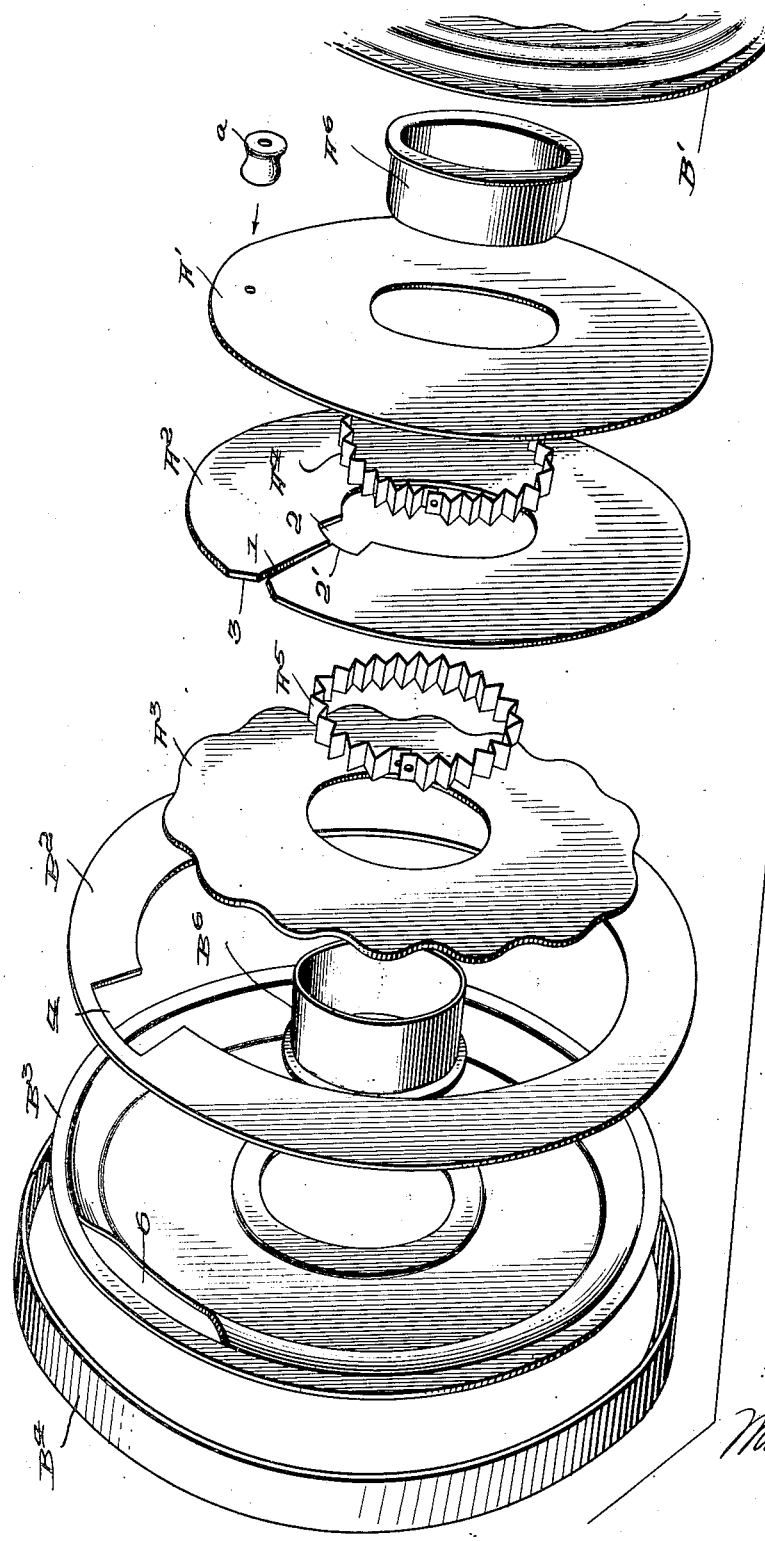
Fig. 5 is an exploded view of the parts of the spool and casing.
Figure 8:
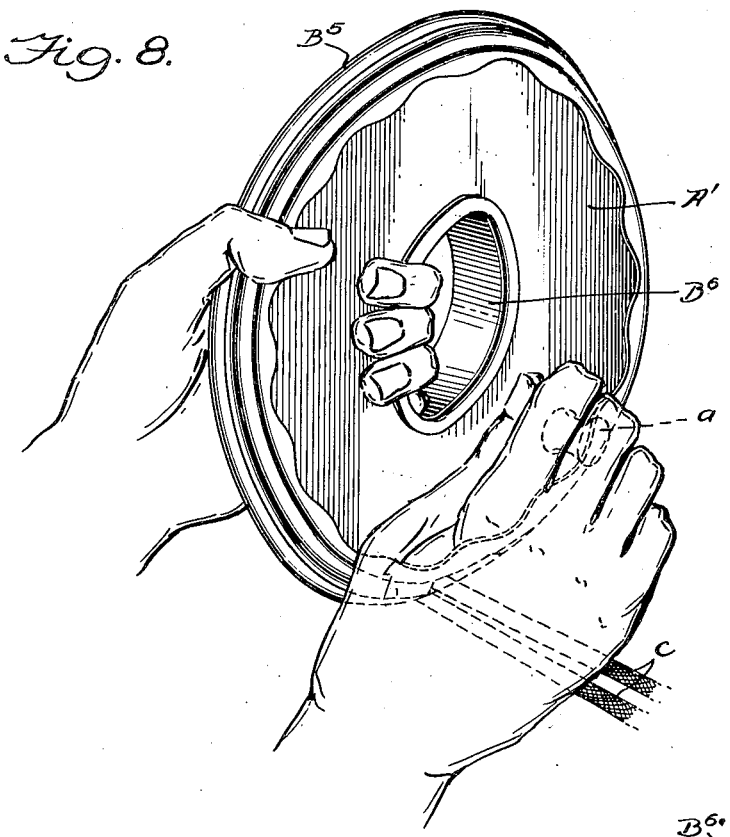
Fig. 8 shows the manner of holding the reel with the left hand while the reel is being turned by operating its knob with the right hand in the act of winding.
Figure 7:
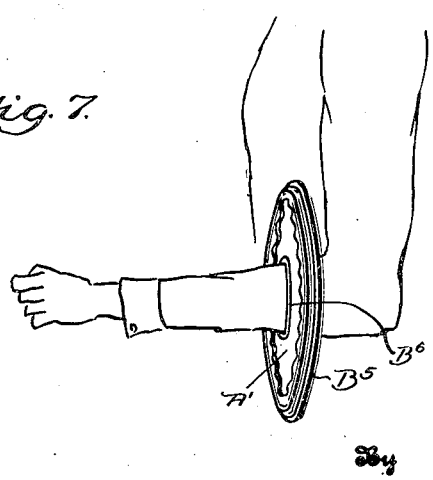
Fig. 7 is a view showing the reel carried on the arm of the operator.
Figure 6:
Fig. 6 is a longitudinal section of the preferred form of the inner cylinder which forms a part of the casing.

The casing comprises a front ring member $B^1$, a pan-shaped back member $B^3$, and a central dividing member $B^2$, all held together by a flanged cylinder $B^6$ and a clamping band $B^5$ spun on the edges of the casing parts from a blank $B^4$ (Fig. 5).

An inwardly opening recess 4 in the ring $B^2$ registers with openings 6, $6'$ in the front and rear walls of the casing respectively.

The cord C carries a socket $C^1$ at one end and a plug $C^2$ at the other.

When the parts of the spool or reel proper are assembled, they are secured together by flanging the cylinder $A^6$. The parts of the casing are then assembled around the spool and secured together by spinning on the clamp $B^5$ and flanging the inner cylinder $B^6$.

The cylinder $B^{6a}$ is the one used in practice. It is pushed through the assembled parts from the front or upper side; that is, through the right side as viewed in Fig. 2, and the reduced portion at the end of the cylinder is crimped over, fixing it as a horn on the center of the back or lower disk of the casing. Of course, the reduced end of the cylinder may be first secured to the back disk of the casing, and then pushed through cylinder $A^6$ and flanged. In this case the flange at the large end of the cylinder would not be preformed.

If the cord is not fixed to the spool before the spool is mounted in the casing, it may be secured afterward, or an old one may be replaced by a new one, by threading the cord through the registering openings 6, $6'$ and recess 4, until equal lengths of cord extend on opposite sides of the casing, doubling the cord so as to form a loop or bight at the middle, deflecting the ends of the split ring $A^2$ laterally in opposite directions, like opening a key ring, pushing the loop into the open slit, and then pushing the cord home by a flat instrument such as a rule or paddle or spatula. The ring $B^2$ and the disk $A^2$ cooperate to form two distinct compartments for the two coils of the cord. The ring $A^2$ has sufficient resiliency to permit spreading the ends apart and opening the slit wider without staggering or forcing the ends laterally out of the plane of the ring or disk. The loop may thus be forced into the slit from either end by merely pushing or pulling the cord, as the case may be. The loop may also be forced into the slit by the ring $B^2$ if the cord is placed in the recess 2 and rotated with the reel until the cord is carried under the ring.

By twisting a spatula thrust into the slit the cord may be pulled out if the walls 2' are sufficiently flaring, when the slit is brought to the position where its flaring end 3 is in line with openings 6, 6' and recess 4.

For the sake of economizing material, the flange $A^3$ is cut from the blank which is used to form the casing ring $B^1$. If this should be done by making a circular cut, the flange $A^1$ would have to be made larger than the flange $A^3$ in order that the outer edge of flange $A^1$ would be overlapped and enclosed by the inner edge of ring $B^1$. By making the cut wavy or sinusoidal, as shown, the effective outer diameter of flange $A^3$ is as great as the diameter of flange $A^1$, and the effective inner diameter of ring $B^1$ is less than the outer diameter of flange $A^1$, because of the scallops on its inner edges.

Disk or ring $A^2$ is also cut from the blank from which ring $B^2$ is formed.

Where the ends of the respective rings $A^4$ and $A^5$ are joined together, a flattened portion is formed between adjacent corrugations, and these flattened portions are in line with slit 1, as shown in Fig. 3. This provides a seat in which the loop or bight of the cord will enter deeper into the ring and lie flat.

The operation of the reel is as follows:

In carrying it about, the user's arm may be thrust through the central disk of the device. The user may then proceed with other work, while the reel is being used without inconvenience. To unwind, the thumb of the left hand is placed on rim $B^6$ and the fingers pass through the central opening. Both ends of the cord are grasped and pulled equally, so as to spin the spool and unwind both ends alike. The cord is rewound by holding the reel with the recess 4 downward, drawing the cord vertically upwards so as to disentangle or untwist it when going back upon the spool.

The reel is particularly adapted for use with vacuum cleaners, since it may be carried on the arm of the user, and no provision need be made for mounting it on the vacuum cleaner, though it may conveniently be slid over the handles of most forms of such cleaners.

What I claim is:

1. The herein described method of making a reel having a flanged spool and a casing, which comprises cutting the rear flange of the spool from a blank along a sinusoidal line, and assembling the parts of the spool and casing with the front casing member comprising the remaining portion of the blank, the scallops on the inner edge of the opening in the front casing member enclosing and overlapping the outer edge of the front flange of the spool.

2. The herein described method of making a reel having a spool with a partition flange and a casing with a guard member encircling the said flange, which comprises cutting the partition flange of the spool from a blank, and assembling the parts of the spool and casing with the guard member of the casing formed from the remaining portion of the blank and surrounding and in the same plane as the partition flange of the reel.

3. A reel casing having openings in its side members near its periphery of sufficient size to receive the plug or socket of the service cord for an electrical appliance, said periphery being continuous to form a bridge spanning the opening.

4. A reel casing having front and rear members and an interior ring intermediate the said members, registering openings near the peripheries of the said front and rear members, and a recess in the inner periphery of the ring registering with said openings.

5. A spacing ring provided with transverse corrugations, a widened flat space being formed between two adjacent corrugations.

6. A reel having a flange in the form of a ring, said ring having a narrow radial slit extending the major portion of the distance from the inner to the outer periphery of the ring, and an enlargement at each end of the slit, the enlargement at the outer end opening through the periphery of the ring.

7. A reel having a flange in the form of a ring, said ring having a narrow radial slit extending the major portion of the distance from the inner to the outer periphery of the ring, and an enlargement at each end of the slit, one of said enlargements having its walls flaring from the walls of the slit, and opening through the outer periphery of the ring.

8. The herein described method of making a reel having a flanged spool and a casing with front and rear members, which comprises cutting the rear flange of the spool from a blank along a line which forms alternate projections and depressions, the extremities of the projections on the flange lying in a circle of substantially the same diameter as the diameter of the front flange, and assembling the parts of the spool and casing, using the remaining portion of the blank to form the front member of the casing.

9. A reel comprising a flanged spool and a casing having front and back members, the rear flange of the spool having alternate peripheral projections and depressions, extremities of the projections lying in a circle which has approximately the same diameter as the diameter of the front flange, the front casing member having an opening formed with alternate projections and depressions, the extremities of the depressions lying in a circle of substantially the same diameter as the diameter of the front flange of the spool, whereby the projections in the opening overlap the said front flange.

10. The herein described method of making reels having flanged spools with casings having front and rear members, which comprises cutting the rear flanges of the spools from blanks along lines which form alternate projections and depressions, the extremities of a plurality of the inwardly extending projections on the remaining portions of the blanks lying within a circle of substantially the same diameter as that of the front flanges of the spools, forming the front casing members from the remaining portions of the blanks, and assembling the parts, whereby projections on the front casing members overlap the front flanges of the spools.

11. A flanged reel having a spacing ring separating the flanges at their inner portions, said ring having a transversely corrugated outer surface, the space between two adjacent corrugations being wider than the other spaces.

DANIEL BENSON REPLOGLE.